United States Patent [19]

Sanglet

[11] Patent Number: 4,859,447
[45] Date of Patent: Aug. 22, 1989

[54] PROCESS FOR THE PRODUCTION OF SODIUM HYDROSULFITE

[75] Inventor: Philippe R. Sanglet, Gent, Belgium

[73] Assignee: Morton Thiokol, Inc., Chicago, Ill.

[21] Appl. No.: 126,323

[22] Filed: Feb. 18, 1988

Related U.S. Application Data

[62] Division of Ser. No. 945,747, Dec. 22, 1986, Pat. No. 4,788,041.

[51] Int. Cl.$^4$ ............................................. C01B 17/66
[52] U.S. Cl. ...................................................... 423/515
[58] Field of Search ......................................... 423/515

[56] References Cited

U.S. PATENT DOCUMENTS

| | | | |
|---|---|---|---|
| 2,991,152 | 7/1961 | Goerrig et al. | 423/515 |
| 3,226,185 | 12/1985 | Gyan et al. | 423/515 |
| 4,680,136 | 7/1987 | Bernhard | 423/515 |

*Primary Examiner*—Gary P. Straub
*Attorney, Agent, or Firm*—Gerald K. White

[57] ABSTRACT

An improved high yield process and apparatus for producing sodium hydrosulfite by reacting sodium borohydride, sulfur dioxide, sodium hydroxide and sodium bisulfite is disclosed. A continuously recirculating split process stream may be used along with control of pH, temperatures, and concentration parameters to obtain sodium hydrosulfite yields in excess of 85%.

15 Claims, 4 Drawing Sheets

PROCESS FOR THE PRODUCTION OF SODIUM HYDROSULFITE

This is a divisional of co-pending application Ser. No. 945,747 filed on Dec. 22, 1986, now U.S. Pat. No. 4,788,041.

BACKGROUND OF THE INVENTION

1. FIELD OF THE INVENTION

This invention relates to an improved process and apparatus for producing sodium hydrosulfite.

Sodium hydrosulfite, $Na_2S_2O_4$, also known as sodium dithionite, is extensively used as a bleaching agent in the paper and textile industries, and has a wide range of other uses. Because it is relatively unstable, it is generally produced in situ at the point of use, for example in a pulp mill.

2. DESCRIPTION OF THE PRIOR ART

Methods used in the past for producing sodium hydrosulfite have included dissolving zinc in a solution of sodium bisulfite and precipitating the zinc-sodium sulfite with milk of lime to leave the hydrosulfite in solution, and reacting sodium formate with sodium hydroxide and sulfur dioxide.

More recently the present applicants have developed a process wherein caustic soda and sulfur dioxide are mixed with sodium borohydride in an aqueous medium to produce an aqueous solution of the hydrosulfite. The sodium borohydride generally enters the process in a mixture with aqueous sodium hydroxide. This mixture obtainable from the Ventron Division of Morton Thiokol Inc., under the registered Trade Mark BOROL, has good stability since acid hydrolysis of the sodium borohydride is prevented. For convenience, this type of process will be referred to hereinafter as the Borol process.

The theoretical reaction of the Borol process, assuming ideal conditions and 100% yield, would be as follows:

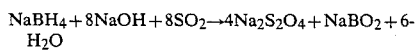

There is however a side reaction in which the sodium borohydride is hydrolysed, thus reducing the overall efficiency of the reaction:

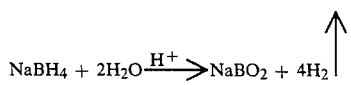

This reaction is a function of pH, and increases with reduced pH. The problem cannot however be overcome simply by raising the pH since this would adversely affect the main reaction. The reaction effectively takes place in two stages, as follows:

(a) the reaction between sulfur dioxide and caustic soda to give sodium bisulfite (I) and (b) the reaction between the bisulfite and sodium borohydride to give sodium hydrosulfite (II).

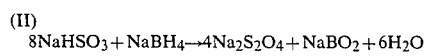

There is also an equilibrium (III) between the bisulfite and sodium sulfite, which is a function of the pH:

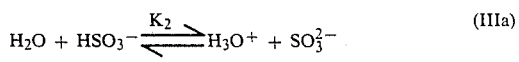

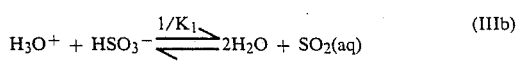

$K_2 = 1.02 \times 10^{-7}$ (18° C.)
$K_1 = 1.54 \times 10^{-2}$ (18° C.)

Above pH7, the bisulfite concentration is inversely proportional to pH. Below pH2, the bisulfite concentration is directly proportional to pH. In the pH range 5–7, within which this type of process is generally operated, lowering the pH will favour the formation of bisulfite.

Consideration of this equilibrium therefore has to be weighed against that of acid hydrolysis discussed above to determine the optimum pH for the process. In the process used hitherto a pH of 6.5 has been found to give the best yield. Nevertheless, it has proved difficult to achieve yields greater than 85%.

In the Borol process used hitherto, $SO_2$, water, sodium hydroxide and a sodium borohydride/sodium hydroxide/water mixture (Borol) are fed in that order into a flow line which leads to a static mixer and thence to a degassing tank where entrained gases are vented to the atmosphere. An aqueous solution of sodium hydrosulfite is pumped from the degassing tank, part of this being delivered to a storage tank for use as required and the rest is recycled to the flow line at a position downstream of the $SO_2$, water and NaOH inlets but upstream of the Borol inlet. The input of each reactant can be controlled automatically in response to rising or falling levels in the degassing tank or the storage tank or changes in pressure, flow rates and/or pH.

The present applicants have sought to improve the yields of the above process by variation in proportions of chemicals, pH measurement and control and different addition methods.

SUMMARY OF THE INVENTION

According to one aspect of the invention, a process wherein sodium borohydride/sodium hydroxide/water mixture is reacted in aqueous solution with sulfur dioxide and sodium hydroxide and/or sodium bisulfite to form sodium hydrosulfite by feeding the reactants to a constantly circulating reaction mixture from which hydrosulfite is drawn off is characterised in that downstream of the point at which the hydrosulfite is drawn off and upstream of the points at which the reactants enter the system the circulating reaction mixture is divided into two streams. The reactants other than the sodium borohydride mixture are fed into one of these streams which then rejoins the other to form a single stream to which the sodium borohydride/sodium hydroxide/water mixture is added.

The reactants other than the sodium borohydride mixture are preferably supplied to the system as sodium hydroxide, sulfur dioxide and water, but various reactant mixtures may be used which include sodium bisulfite, generally formed by pre-reacting a sulfur dioxide/water mixture with sodium hydroxide.

According to a further aspect of the invention, a process of the above type is characterised in that the sulfur dioxide is fed into the system at a point downstream of the point at which sodium hydroxide enters the system rather than upstream of it as in the process used hitherto. Preferably the $SO_2$ is mixed with the water before being fed into the reactant stream containing the sodium hydroxide.

The applicants have found that yields can be improved in processes of the above general type by any or all of the following:

(i) carrying out the reaction at a pH in the range 5.5-6.0, preferably 5.7-6.0;

(ii) carrying out the reaction at a temperature below 12° C.; and (iii) adjusting the reactant concentrations to give a concentration of hydrosulfite at the draw off point of 9-12 wt. %. concentrations above this range may give rise to crystallisation of the hydrosulfite on storage.

According to a preferred feature of the invention the reactants are fed into the reactant stream through nozzles positioned centrally in the reactant stream and aligned in the direction of flow so that each reactant joins the stream at approximately the prevailing speed of flow to reduce turbulence. The improved "kinetic" mixing obtained in this way prevents or reduces sudden changes in the pH of the reaction mixture.

In the process of the invention, if sodium hydroxide and sulfur dioxide are fed to the system, reaction (I) takes place as outlined above, giving a mixture of sodium bisulfite and sulfur dioxide. This mixture preferably has an $SO_2$ concentration of 95 to 120 g.l$^{-1}$ more preferably 100 to 115 g.l$^{-1}$. The ratio of bisulfite/$SO_2$ in the mixture is preferably in a range from 1:1.20 to 1:1.50, most preferably about 1:1.35. Alternatively, an aqueous mixture of sulfur dioxide and sodium bisulfite may be fed to the system, for example one of the solutions disclosed in EP-A-No. 0202210.

The reaction mixture should normally be kept at a pressure of at least 300 kPa to keep the $SO_2$ liquid. The preferred pressure range is 300 to 350 kPa, but higher pressures may also be used.

The preferred reaction temperature is below 12° C., more preferably 7° to 10° C. It has been found that at such relatively low temperatures the loss of $NaBH_4$ through acid hydrolysis is substantially reduced. One possiblity is that a relatively low temperature simply reduces the kinetic rate of borohydride hydrolysis. Whatever the actual mechanism, this reduction in hydrolysis in turn makes it possible to carry out reaction (II) at slightly lower pH than in the process used hitherto, for example 5.5 to 6.0. This favours the bisulfite in equilibrium (III), thus increasing the yield of the bisulfite/borohydride reaction (II).

A further possibility is that under such conditions of temperature and pressure at least a part of the sulfur dioxide may be in the form of a hexahydrate $SO_2.6H_2O$, inhibiting to some extent direct contact between the strongly acid free $SO_2$ and the $NaBH_4$ which it encounters further downstream, and thus reducing the acid hydrolysis of the $NaBH_4$.

The sodium borohydride/sodium hydroxide/water mixture used in the process of the invention preferably comprises 10-15 wt. % $NaBH_4$, 35-45 wt. NaOH and 40-55 wt. % water. The Borol mixture of Morton Thiokol Inc., comprises 12% $NaBH_4$, 40% NaOH and 48% water.

According to a further aspect of the invention there is provided apparatus for the production of soidum hydrosulfite comprising a recycling loop including a static mixer provided with cooling means, a degassing tank downstream of the static mixer, a circulating pump and a draw-off point for sodium hydrosulfite, wherein downstream of the draw-off point the recycling loop is divided into first and second flow lines, the first flow line having one or more input points for water, sulfur dioxide and sodium hydroxide or sodium bisulfite, or mixtures thereof, the second flow line rejoining the first downstream of said input points.

DESCRIPTION OF THE PREFERRED EMBODIMENTS

Figure 1:
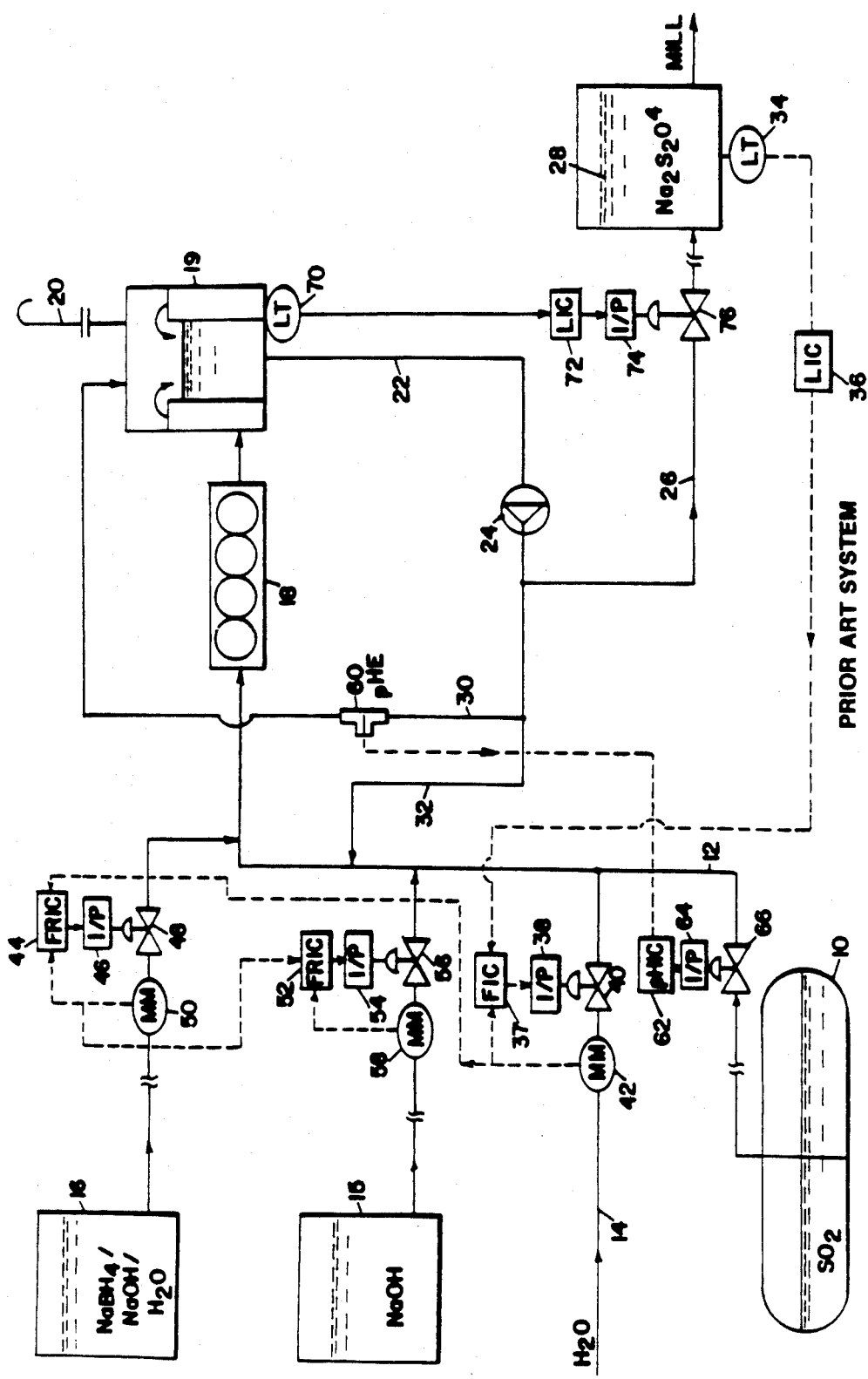
FIG. 1 is a simplified flow diagram illustrating the prior art process described above.

Referring first to FIG. 1, a flow line 12 is fed with liquid sulfur dioxide from a tank 10, water from a supply line 14, sodium hydroxide from a storage tank 15 and a sodium borohydride/sodium hydroxide/water mixture (referred to hereinafter as Borol) from a storage tank 16. When the sodium hydroxide joins the flow line 12, reaction (I) referred to above takes place to generate sodium bisulfite. When the Borol mixture joins the system further downstream, the reaction (II) starts to take place to generate sodium hydrosulfite. The reaction mixture is fed to a static mixer 18 and thence to a degassing tank 19 from which gaseous products such as hydrogen are vented from the system to the atmosphere through a vent pipe 20.

A flow line 22 leads from the bottom of the degassing tank 19, the sodium hydrosulfite solution from the degassing tank being circulated through this flow line by a pump 24. Downstream of the pump the flow line is divided into a first line 26 leading to a hydrosulfite storage tank 28 and a second line 32, which recycles a proportion of the hydrosulfite solution to the flow line 12, downstream of the sodium hydroxide input but upstream of the Borol input. A minor proportion of the solution from flow line 32 is drawn off along a flow line 30 and recirculated directly to the degassing tank 19.

A pulp mill or the like is fed with sodium hydrosulfite directly from the storage tank 28. As hydrosulfite solution is drawn off from this tank, the fall in level is sensed by a level transmitter (LT) 34 which sends an electrical signal to a level indicator control (LIC) 36 which in turn transmits a signal to a flow indicator control (FIC) 37 which in turn operates a current/pressure transducer (I/P) 38 which operates a pressure valve 40 to increase the flow of water to the system.

The flow of water through the input line 14 is sensed by a magmeter flow meter (MM) which sends a signal to the FIC 37 to regulate the flow, and also to a flow ratio indicator control (FRIC) 44 which controls the supply of Borol via an I/P transducer 46 which operates a pressure valve 48. The flow of Borol mixture is sensed by a magnetic flow meter 50 which sends a signal to the FRIC 44 and to an FRIC 52 which controls the input of NaOH via an I/P transducer 54 and pressure valve 56. The flow of NaOH into the system is also monitored by a magnetic flow meter 58 which sends a flow measurement signal back to the FRIC 52.

The various control functions 36,37 etc., are shown for simplicity in FIG. 1 as individual microprocessor functions. In practice of course all these functions are likely to be performed by a single central process computer.

The input of $SO_2$ to the system is controlled as a function of the pH in the recirculating reaction mixture. The pH of the solution in the branch pipe 30 is monitored by a pH electrode (pHE) 60 which sends a signal to a pH indicator control (pHIC) 62 which controls the input of $SO_2$ by means of an I/P transducer 64 and a pressure valve 66. As mentioned above, this prior art process is generally operated at a pH of about 6.5. If the monitored pH rises above the predetermined value, the pHIC 62 will act to increase the flow of $SO_2$ and similarly if the pH falls the input of $SO_2$ will be reduced.

If the level in the degassing tank 19 falls below a predetermined level, a level transmitter 70 will send a signal to a level indicator control 72 to reduce the flow of hydrosulfite through flow line 26 to storage tank 28, by means of an I/P transducer 74 and pressure valve 76.

Using a Borol solution having the composition specified above, in which the molar ratio of NaOH to $NaBH_4$ is 3.2:1, the overall equation for reactions (I) and (II) above becomes:

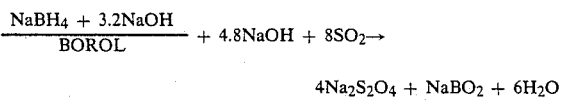

$$4Na_2S_2O_4 + NaBO_2 + 6H_2O$$

On this basis, assuming an overall reaction efficiency for the above prior art process of 85%, the actual quantity of each reactant required to produce one kilogram of 100% active sodium hydrosulfite is shown to be:
  0.533 kg Borol mixture
  0.325 kg NaOH (based on 100%) and
  0.865 kg $SO_2$ The amount of water depends on the desired concentration of the final hydrosulfite solution, which is usually 2 to 6 wt %.

Figure 2:
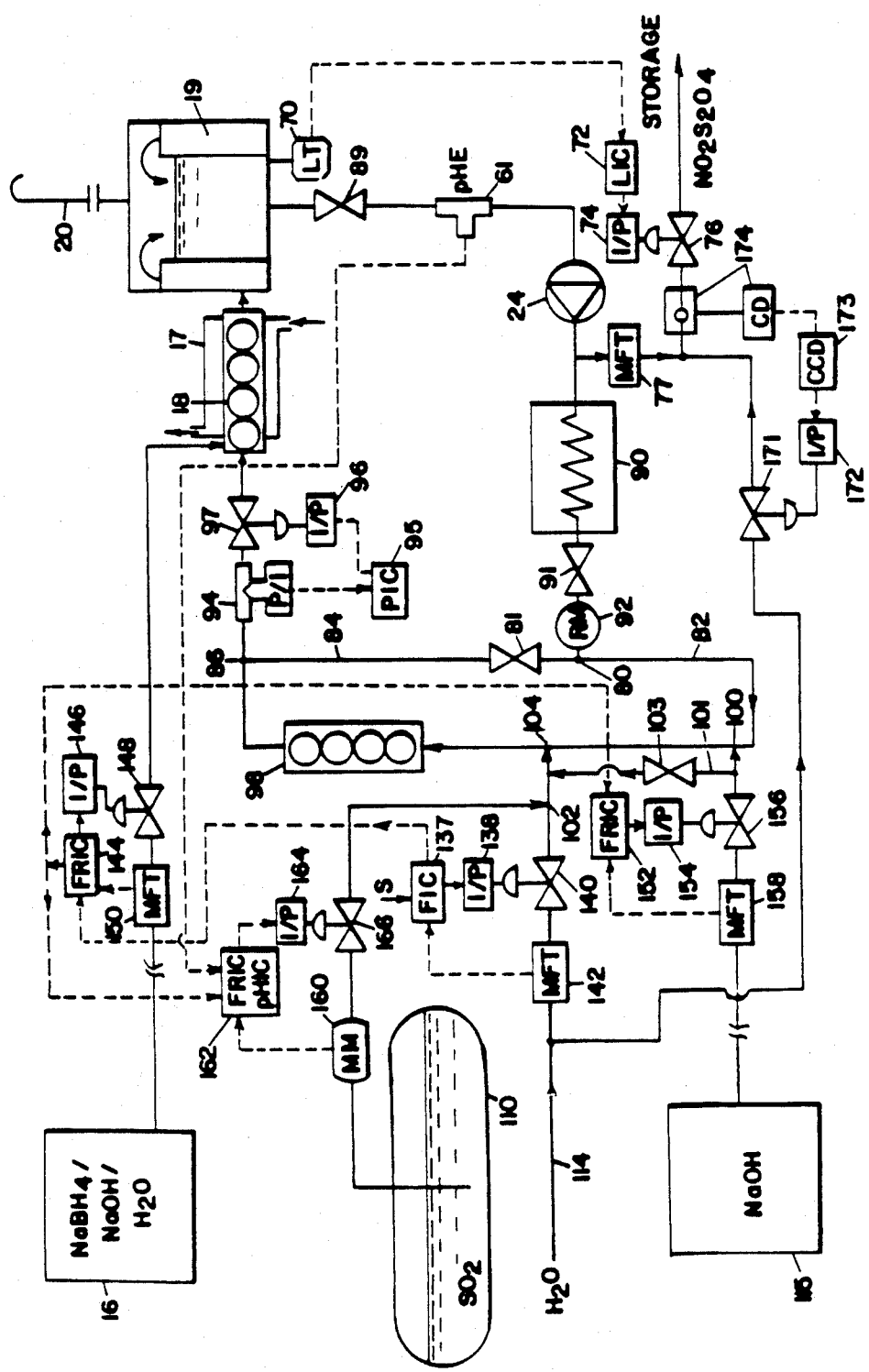
FIG. 2 shows diagrammatically a process in accordance with a first embodiment of the present invention.

Referring to FIG. 2 of the drawings, certain features which are essentially identical to those shown in FIG. 1 are given the same reference numerals. As in the embodiment of FIG. 1, the sodium hydroxide, water and sulfur dioxide are mixed to initiate the production of sodium bisulfite and Borol mixture is then added, the reaction mixture being passed through a static mixer 18 and thence to a degassing tank 19. The mixture entering the static mixer is preferably at a temperature of about 10° C. The static mixer 18 has a water cooling jacket 17, whereby the temperature of the reaction mixture is reduced to about 8° C. Again, the flow of sodium hydrosulfite solution from the degassing tank to storage is controlled by level transmitter 70, LIC 72, I/P transducer 74 and pressure valve 76. There is also provided a control valve 89 and a magnetic flow tube (MFT) 77 so that the flow rate of hydrosulfite to storage can be monitored.

The concentration of the hydrosulfite leaving the recycle stream is generally in the range of 9–12 wt %. Increased yields can be obtained by operating the process at this relatively high concentration, but storage stability is reduced. If therefore the hydrosulfite is not to be used immediately it should be diluted down to a concentration of 4–5 wt %. For this purpose, water is supplied through a conduit 170, tapped off from the main water supply 114. The supply of diluting water to the hydrosulfite solution is controlled by a valve 171 operated by an I/P transducer 172 and a conductivity control microprocessor (CCD) 173 which monitors the concentration of the solution, downstream of the input of diluting water, by means of a conductivity cell 174.

The pump 24 for the recycled stream of hydrosulfite is in this embodiment positioned downstream of pH electrode 61, which controls the input of $SO_2$ as will be described below. Downstream of the pump 24, and of the point at which hydrosulfite is drawn off to storage, the solution passes through a heat exchanger 90, another control valve 91 and a rotameter 92. The heat exchanger cools the reaction mixture from about 12° C., to which it has risen as a result of the exothermic reaction, to about 7° C. The flow line is then divided at a point 80 into first and second flow lines 82,84. A manually-controlled valve 81 in flow line 84 controls the relative proportions of the flow passing through the two flow lines. Preferably 20–60% of the flow, typically 40%, passes through the first flow line 82 and 40–80%, typically 60%, through the second flow line 84.

Sodium hydroxide from supply tank 115 is fed into flow line 82 at a point 100. $SO_2$ from supply tank 110 joins the water supply line 114 at a position 102 and the resulting mixture is fed into the flow line 82 at a position 104, downstream of the NaOH input rather than upstream as in the previous Borol process. The reaction mixture then passes through a static mixer 98 and onto the main static mixer 18 where Borol mixture from the supply tank 16 is fed into the system. The second flow line 84 rejoins flow line 82 at a position 86 between the two static mixers 98,18. The flow rate of the recirculating mixture entering static mixer 18 is monitored by a pressure indicator (PI) 94 which sends a signal to pressure indicator control (PIC) 95 which in turn feeds a signal to an I/P transducer 96 which operate a pressure valve 97 controlling the flow to the static mixer 18.

To reduce still further the change in pH as the $SO_2$ joins the recycle stream a proportion of the NaOH (suitably 10–50% of the total NaOH flow and preferably 35–40%) is fed through a bypass line 101 to the $SO_2$ input line, joining this line downstream of the position 102 at which the $SO_2$ joins the water flow. The flow through the bypass line is controlled by a valve 103, which may be operated automatically in response to monitored flow rates of water, NaOH and $SO_2$.

The hydrosulfite storage tank 28 of FIG. 1 is not shown in FIG. 2, but it will be understood that the system of FIG. 2 may feed a storage tank in exactly the same way as in FIG. 1.

A system of FIG. 2 has a automatic control system operating in a similar way to that of FIG. 1. Input signals S, which may correspond to level signals from a storage tank as in FIG. 1, are fed to an FIC 137, which in turn sends signals to an I/P transducer 138 to operate a pressure valve 140 in the water feed line 114. The FIC 137 also receives the flow rate data from a magnetic flow tube (MFT) 142 in the water flow line, and transmits flow data to an FRIC 144 controls the supply of Borol mixture to the static mixer 18 by means of I/P transducer 146 and pressure valve 148 monitoring the flow rate by means of an MFT 150.

Flow rate data for water and the Borol mixture are also transmitted by the the FRIC 144 to an FRIC 152 and to a combined FRIC and pH indicator control 162 which control the input of sodium hydroxide and sulfur dioxide respectively. The FRIC 152 controls the input of NaOH by means of I/P transducer 154 and pressure valve 156 and monitors the input of NaOH by means of magnetic flow tube 158. The control unit 162 also receives pH data from a pH electrode 61, as well as from a micro-massmeter 160 which monitors the flow rate of $SO_2$. This flow rate is controlled by means of I/P transducer 164 and pressure valve 166.

The signals to the I/P transducer 164 from the control unit 162 are preferably determined to a much greater extent by the flow ratio data than by the pH data. Suitably the signals are based to an extent of 75-85%, preferably about 80%, on flow ratio data and 15-25%, preferably about 20%, on pH data.

By splitting the recycle stream at 80, a more balanced input of reactants is obtained since there is less difference in volume between the recycle stream and the reactants entering it. There is also a less drastic dilution of the reactants.

Figures 3, 4:
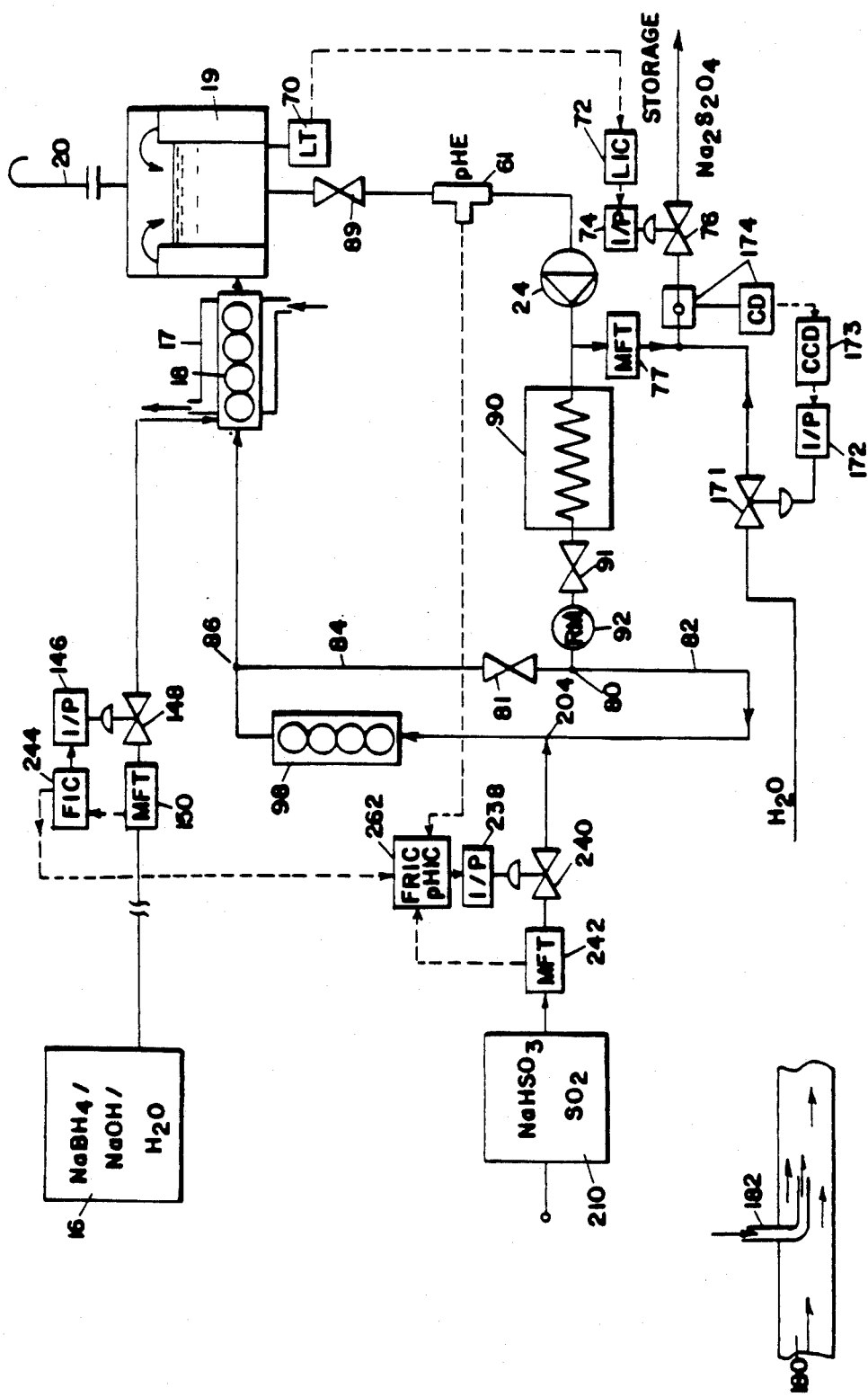
FIG. 3 shows diagrammatically a system in accordance with a second embodiment of the invention.
FIG. 4 shows a kinetic mixing nozzle used in the process of the present invention.
Figure 5:
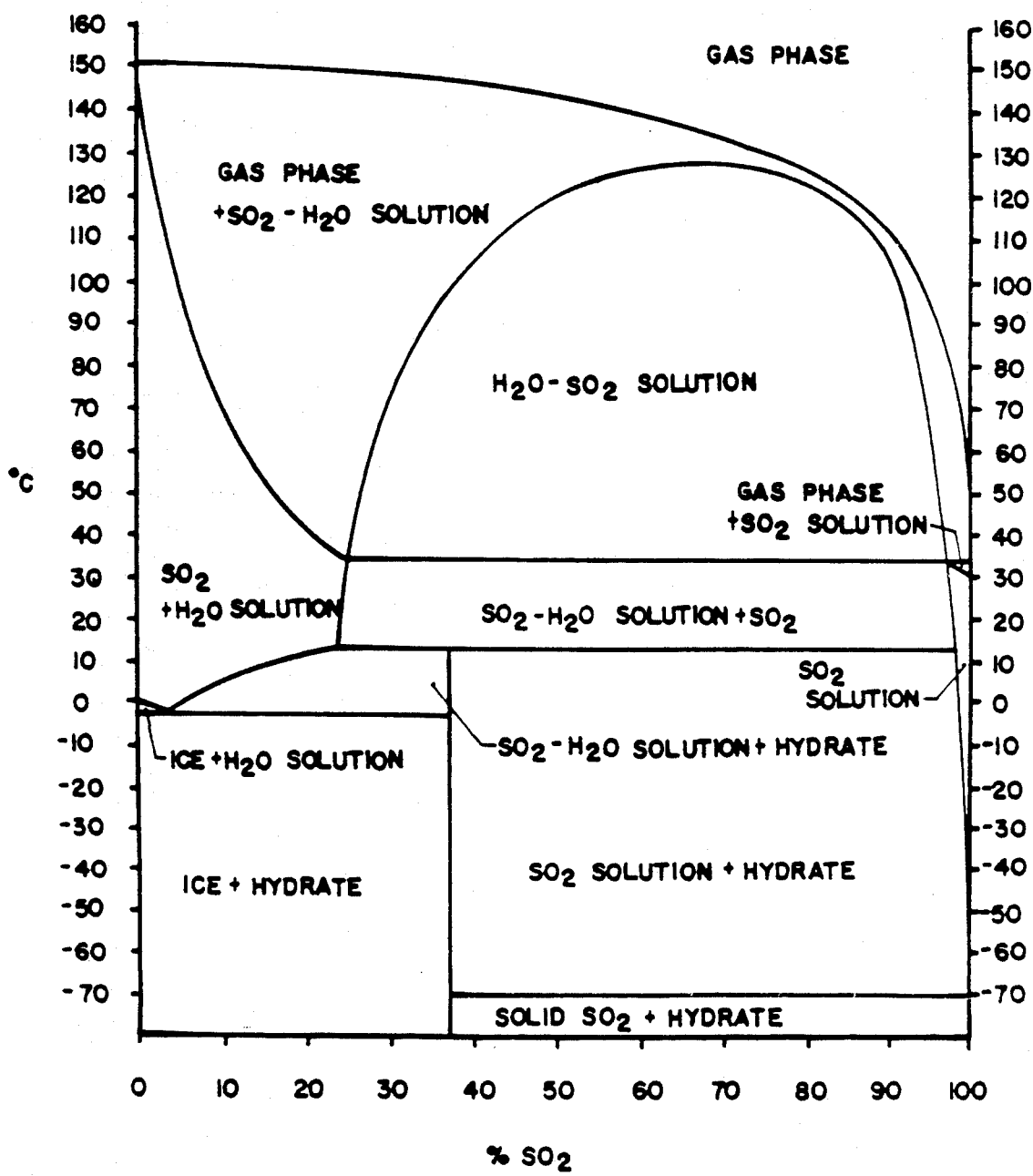
FIG. 5 is a water/$SO_2$ phase diagram showing the concentrations and conditions under which the $SO_2$ forms a hydrate.

The systems shown in FIG. 3 uses, instead of separate inputs of NaOH, $SO_2$ and water, a single input of an aqueous solution of sodium bisulfite and sulfur dioxide. In this Figure, components which are identical to those of FIG. 2 are given the same reference numerals and will not be described in detail. This system is similar to that of FIG. 2 insofar as it comprises a recycling system with a cooled static mixer 18, a degassing tank 19, a pump 24, a draw-off point and diluting system for the product, a heat exchanger 90 and a split stream comprising an input line 82 and a bypass line 84.

The input line 82 has a single input point 204 for an aqueous $SO_2/NaHSO_3$ solution from a supply 210. The flow of this solution is controlled by a valve 240 actuated by an I/P transducer 238 which in turn is controlled by an FRIC/pHIC 262. This unit receives signals from the pH electrode 61 as in the system of FIG. 2, and also from a magnetic flow tube 242 monitoring the flow rate of the bisulfite/$SO_2$ solution and from an FIC 244 which monitors the flow of sodium borohydride solution to the system. This latter unit replaces the FRIC 144 of FIG. 2 since it receives only the flow rate data from the magnetic flow tube 150. As in the system of FIG. 2, the control unit 262 preferably controls the input of the bisulfite/$SO_2$ solution to an extent of about 80% on the basis of flow ratio data and 20% on the basis of pH data.

FIG. 3 shows the way in which the various reactants are preferably fed to the system in accordance with the invention, at input points 100,102 and 104. A similar system can be used to feed in the Borol mixture, rather than feeding it directly to the static mixer as shown in FIG. 2. The main flow line is indicated by 180, the ingredient being added, such as the NaOH or the $SO_2$/water mixture, entering the system through a nozzle 182 positioned with its end substantially co-axial with the flow line. The nozzle is such that the flow rate of the reactant entering the system is substantially the same as that of the circulating reaction mixture in the flow line. This means that all of the reactant entering the system at this point is carried along by the circulating reaction mixture, without any of it adhering to the sides of the flow line around the entry point. This helps to ensure that a homogeneous mixture is obtained and that sudden changes in composition and, more especially, pH, are avoided.

FIG. 4 is a phase diagram for a sulfur dioxide/water system as fed to the apparatus of the invention, the percentage content of $SO_2$ being plotted against temperature at a pressure of 500 kPa. Although the process of the present invention is normally operated at somewhat lower pressures such as 250-300 kPa the relevant parts of the phase diagram will be essentially the same. It can be seen from this that at the temperatures and concentrations normally used in the process of the invention a part of the $SO_2$ is in the form of hydrate described above.

The system described above has been found to give substantially improved yields over those obtained with the previous Borol process, yields of 90% and even 95% and above being easily obtainable. Important factors in achieving this are thought to include the feeding of NaOH to the recycled upstream from the input of $SO_2$, avoiding any drastic pH drop, and the kinetic mixing obtained by the use of nozzles such as 182 to feed the reactants to the system, the ratios of $SO_2$/water and bisulfite/$SO_2$ and the realtively low temperature.

Taking into consideration that the system operates under a slight excess of bisulfite (typically a 10-15% excess) the balanced equation (based on 90% yield) can be transformed into:

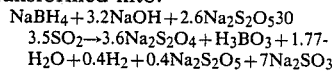

$$NaBH_4 + 3.2NaOH + 2.6Na_2S_2O_5 30$$
$$3.5SO_2 \rightarrow 3.6Na_2S_2O_4 + H_3BO_3 + 1.77\text{-}$$
$$H_2O + 0.4H_2 + 0.4Na_2S_2O_5 + 7Na_2SO_3$$

Based on this equation the actual quantity of each material required to produce one kilogram of 100% active hydrosulfite is shown to be:

0.503 kg Borol mixture
0.332 kg NaOH (at 100%) and
0.889 kg $SO_2$

There are various different ways in which the percentage yield obtained by the process of the invention may be calculated. Three such methods which will be referred to herein are as follows:

PER CENT YIELD BASED ON HYDROGEN AND BOROL SOLUTION FLOW

If the relation between the Borol solution and bisulfite is quantitative no hydrogen is evolved. In fact some hydrogen evolution occurs due to undesired decomposition (hydrolysis) of the sodium borohydride in the Borol solution that does not react with bisulfite.

By measuring this hydrogen flow, relative to the Borol solution flow, the efficiency of the hydrosulfite generation reaction can be calculated.

PER CENT YIELD BASED ON MASS BALANCE

This yield determination method is based on the stoichiometry of the balanced equation for conversion of the reactant feed chemicals to hydrosulfite product.

The actual yield of hydrosulfite is determined by the titration of the hydrosulfite concentration in the product solution. The per cent yield is then calculated by the ratio of actual hydrosulfite produced to that theoretically produced according to the stoichiometry of the balanced equation and the reactant chemical feed.

PER CENT YIELD BASED ON BORON CONCENTRATION IN BOROL SOLUTION AND IN HYDROSULFITE PRODUCT

This per cent yield calculation method uses boron analysis to calculate the amount of odium borohydride in the Borol solution reactant chemical feed that is actually consumed in the production of hydrosulfite product.

The boron in commercial Borol solutions is predominantly in the form of sodium borohydride, but a small quantity of boron is also present as sodium metaborate. This latter impurity is determined analytically by first analysing the Borol solution for sodium borohydride concentration and then determining total boron by atomic absorption or mannitol titration of hydrolysed sample. From the difference in these determinations, boron as metaborate is calculated.

Next, the hydrosulfite product is analysed for boron content. The boron contribution for metaborate due to this impurity in the Borol solution reactant is subtracted out and the remaining borom is attributed to sodium borohydride used in the stoichiometrically balanced equation to form hydrosulfite. From a titration of the product for actual hydrosulfite and the theoretical hydrosulfite possible (based on boron analysis), the per cent yield is calculated.

The process of the invention wil be illustrated further by the following Examples:

EXAMPLE 1

A system as depicted in FIG. 2 is operated with the following fixed process parameters:

| | | |
|---|---|---|
| Reactant Feed Pressure (BAR): | Borol Solution | 4.65 |
| | NaOH | 4.58 |
| | $SO_2$ | 5.92 |
| Recycle Flow Rate ($M^3$/Hr): | | 20 |
| Split Stream Ratio (Percent of feed stream diverted to chemical feed side): | | 20 |

Other operating parameters are varied as shown below and hydrosulfite yields are determined by using the previously mass balance method.

| | Sample Designation | | | | | |
|---|---|---|---|---|---|---|
| | A | B | C | D | E | F |
| OPERATING PARAMETERS: | | | | | | |
| Temperature (°C.) | 9.5 | 9.5 | 9.4 | 7.3 | 9.4 | 11.4 |
| pH | 5.90 | 5.93 | 5.92 | 5.83 | 5.90 | 5.88 |
| Water Feed (L/min) | 16.4 | 10.0 | 16.4 | 9.4 | 15.6 | 22.8 |
| Hydrosulfite conc. (wt. %) | 11.14 | 11.21 | 10.64 | 11.23 | 10.64 | 11.02 |
| YIELD RESULTS: | | | | | | |
| Hydrosulfite Yield (wt. %) | 98.0 | 96.9 | 93.7 | 93.3 | 90.2 | 96.8 |

EXAMPLE 2

A system as depicted in FIG. 2 is operated as shown in Example 1 and with various pH values and various ratios between the bisulfite/$SO_2$ (Generated by Reaction I) and the Borol feed. Hydrosulfite yields are determined by the previously described mass balance method.

| Ratio $NaHSO_3/SO_2$ System to Borol Solution | pH | Hydrosulfite Yield |
|---|---|---|
| 28 | 5.6 | 97.4 |
| | 5.9 | 97.4 |
| | 6.0 | 95.1 |
| | 6.3 | 93.6 |
| 19 | 6.5 | 92.3 |
| | 6.6 | 90.7 |
| 15 | 6.9 | 87.1 |
| | 7.0 | 87.5 |

It can be seen from the above Table that greatly improved yilds are obtained, even at the pH values used in the previous Borol process and system (FIG. 1). At the lower pH values, such as the 5.5 to 6.0 preferred for the process of the invention, yields in excess of 95% are obtained. The optimum pH for the process is considered to be 5.9.

EXAMPLE 3

A system as depicted in FIG. 2 is operated with the following process parameters:

| | |
|---|---|
| pH | 5.91 |
| Temperature (°C.) | 9.8 |
| Recycle Flow Rate($M^3$/Hr) | 12-20 |
| Split Stream Ratio (Percent of feed stream diverted to chemical feed side) | 40 |
| Caustic Inection (Percent of total caustic flow injected into the $SO_2$/water system) | 30 |

The hydrosulfite yield is determined by two previously described methods, the totol boron method and the mass balance methods.

| Yield Determination Method | Hydrosulfite Conc. (wt. %) | Hydrosulfite Yield (%) |
|---|---|---|
| Total boron | 11.57 | 95.1 |
| Mass balance | 10.17 | 94.0 |

EXAMPLE 4

A system as depicted in FIG. 3 is operated with the following process parameters:

| | |
|---|---|
| Temperature (°C.) | 10-11 |
| pH | 5.6-5.8 |
| Recycle Flow Rate ($M^3$/Hr) | 25-30 |
| Hydrosulfite Conc. (wt. %) | 12 |

The hydrosulfite yield is determined by three previously described methods: the hydrogen and Borol solution flow method; the mass balance method; and the total boron method.

| Yield Determination Method | Hydrosulfite Yield |
|---|---|
| Hydrogen and Borol solution flow | 96.3 |
| Mass balance | 95.4 |
| Total boron | 96.7 |

What is claimed is:
1. A process for producing sodium hydrosulfite, comprising:
   a. establishing a first process flow stream comprising an aqueous mixture of at least sodium hydrosulfite and sodium bisulfite;
   b. introducing sodium hydroxide solution into said first Process stream;

c. introducing water and sulfur dioxide into said first process stream at a location downstream from where said sodium hydroxide solution is introduced wherein sodium hydroxide and sulfur dioxide react to form an aqueous solution of sodium bisulfite;

d. introducing a mixture comprising sodium borohydride, sodium hydroxide, and water into said first process stream wherein said first process stream and said mixture are mixed and react to form a further process stream comprising an aqueous solution of sodium hydrosulfite;

e. removing hydrogen from said further process stream of an aqueous solution of sodium hydrosulfite so as to form a stream of degassed sodium hydrosulfite; and f. dividing said degassed stream into two portions and then passing a portion of said degassed stream to a storage location and passing and recycling the other portion of said degassed stream into said first process stream at two locations, one location upstream from where said sodium hydroxide solution is introduced and one location between where said water and sulfur dioxide are introduced and where said mixture of sodium borohydride, sodium hydroxide, and water is introduced.

2. The process of claim 1 wherein said first process stream is maintained at a temperature below about 12° C. and within a pH range of about 5.5 to 6.0 at a location where said mixture of sodium borohydride, sodium hydroxide, and water is introduced into said first process stream.

3. The process of claim 1 which includes the step of adjusting the composition of said degassed stream to produce a sodium hydrosulfite concentration from about 9 to 12 wt %.

4. The Process of claim 2 wherein sulfur dioxide is introduced into said first process stream in an aqueous solution.

5. The process of claim 4, wherein a proportion of the sodium hydroxide entering said first process stream is added to said queous solution of sulfur dioxide before said aqueous solution enters said first stream.

6. A process for producing sodium hydrosulfite, comprising:
   a. establishing a first process flow stream comprising an aqueous mixture of at least sodium hydrosulfite and sodium bisulfite;
   b. introducing sodium hydroxide solution into said first process stream;
   c. introducing water and sulfur dioxide into said first process stream at a location downstream from where said sodium hydroxide solution is introduced wherein sodium hydroxide and sulfur dioxide react to form an aqueous solution of sodium bisulfite;
   d. introducing a mixture comprising sodium borohydride, sodium hydroxide, and water into said first process stream whereby said first process stream and said mixture are mixed and react to form a further process stream comprising an aqueous solution of sodium hydrosulfite. said reaction occurring at a temperature below about 12° C. and within a pH range of about 5.5 to 6.0;
   e. removing hydrogen from said further process stream of an aqueous solution, of sodium hydrosulfite so as to form a stream of degassed sodium hydrosulfite;
   f. adjusting the composition of said degassed stream to produce a sodium hydrosulfite concentration from about 9 to 12 wt %; and
   g. dividing said degassed stream into two portions and then passing a portion of said degassed stream to a storage location and passing and recycling the other portion of said degassed solution into said first process stream at two locations, one location upstream from where said sodium hydroxide stream is introduced and one location between where said water and sulfur dioxide are introduced and where said mixture of sodium borohydride, sodium hydroxide, and water is introduced.

7. A process for producing sodium hydrosulfite, comprising:
   a. establishing a first process flow stream comprising an aqueous mixture of at least sodium hydrosulfite and sodium bisulfite;
   b. introducing an aqueous mixture comprising sodium bisulfite and sulfur dioxide into said first process stream;
   c. introducing a mixture comprising sodium borohydride, sodium hydroxide, and water into said first process stream whereby said first process stream and said mixture are mixed and react to form a further process stream comprising an aqueous solution of sodium hydrosulfite;
   d. removing hydrogen from said aqueous solution of sodium hydrosulfite process stream so as to form a stream of degassed sodium hydrosulfite; and
   e. dividing said degassed stream into two portions and then passing a portion of said degassed stream to a storage location and passing the other portion of said degassed stream into said first process stream at two locations, one location upstream from where said solution of sodium bisulfite and suliur dioxide is introduced and one location between where said solution of sodium bisulfite and sulfur dioxide is introduced and where said mixture of sodium borohydride, sodium hydroxide, and water is introduced.

8. The process of claim 7 wherein said aqueous mixture of sodium bisulfite and sulfur dioxide has a sulfur dioxide concentration of about 95 to 120 g.l$^{-1}$.

9. The process of claim 8 wherein said aqueous mixture of sodium bisulfite and sulfur dioxide is in a ratio of bisulfite/$SO_2$ in a range from 1:1.20 to 1:1.50.

10. The process of claim 9 wherein said aqueous mixture of sodium bisulfite and sulfur dioxide is in a ratio of bisulfite/$SO_2$ of about 1:1.35.

11. The process of claim 7 wherein said first process stream is maintained at a temperature below about 12° C. and a pH range of about 5.5 to 6.0 at a location where said mixture of sodium borohydride, sodium hydroxide, and water is introduced into said first process stream.

12. The process of claim 7 which includes the step of the composition of said degassed stream to produce a sodium hydrosulfite conoentration from about 9 to 12 wt %.

13. A process for producing sodium hydrosulfite, comprising:
   a. establishing a first process flow stream comprising an aqueous mixture of at least sodium hydrosulfite and sodium bisulfite;
   b introducing a mixture comprising sodium bisulfite and sulfur dioxide into said first process stream, said mixture containing sulfur dioxide in a concentration of about 95 to 120 g.l$^{-1}$ and sodium bisulfite and sulfur dioxide in a ratio of bisulfite/$SO_2$, in a range from 1:1.20 to 1:1.50;

c. introducing a mixture comprising sodium borohydride, sodium hydroxide, and water into said first process stream whereby said first process stream and said mixture are mixed and react to form a further process stream comprising an aqueous solution of sodium hydrosulfite, said reaction occurring at a temperature below about 12° C. and within a pH range of about 5.5 to 6.0;

d. removing hydrogen from said aqueous solution of sodium hydrosulfite process stream so as to form a stream of degassed sodium hydrosulfite;

e. adjusting the composition of said degassed stream to produce a sodium hydrosulfite concentration from about 9 to 12 wt %; and f. dividing said degassed stream into two portions and then passing a portion of said degassed stream to a storage location and passing and recycling the other portion of said degassed stream into said first process stream at two locations, one location upstream from where said solution of sodium bisulfite and sulfur dioxide is introduced and one location between where said solution of sodium bisulfite and sulfur dioxide is introduced and where said mixture of sodium borohydride, sodium hydroxide, and water is introduced.

14. In a process for producing sodium hydrosulfite by reacting, in an aqueous solution, feed streams containing sodium borohydride, sodium hydroxide, sulfur dioxide, and sodium bisulfite. the improvement comprising conducting said process within a pH range of about 5.5 to 6.0 while maintaining a temperature of below about 12° C. at a location where said sodium borohydride feed stream is first mixed with other streams.

15. The process of claim 14 which further includes the step of adjusting the reacting concentrations to result in a hydrosulfite concentration at a draw-off position of from about 9 to 12 wt %.

* * * * *

UNITED STATES PATENT AND TRADEMARK OFFICE
CERTIFICATE OF CORRECTION

PATENT NO. : 4,859,447
DATED : Aug. 22, 1989
INVENTOR(S) : Philippe R. Sanglet

It is certified that error appears in the above-identified patent and that said Letters Patent is hereby corrected as shown below:

Column 2, Line 45, "hydroxidc" should be --hydroxide--.

Column 3, line 60, after "wt.", insert -- % --.

Column 10, line 68, "Process" should have a lower case P.

Column 11, Claim 6, subparagraph d, line 6, delete the period (.) and insert a comma (,).

Column 12, Claim 6, subparagraph g, line 4, delete "solution" and insert --stream--; line 7, delete "stream" and insert -- solution --.

Column 12, Claim 12, line 1, after "step of" insert --adjusting--.

Column 12, Claim 7, subparagraph e, line 6, "suliur" should be --sulfur--.

Signed and Sealed this

Fourth Day of August, 1992

Attest:

DOUGLAS B. COMER

*Attesting Officer*    *Acting Commissioner of Patents and Trademarks*